(No Model.) 2 Sheets—Sheet 1.
J. G. ALEXANDER.
CULTIVATOR.
No. 601,226. Patented Mar. 29, 1898.
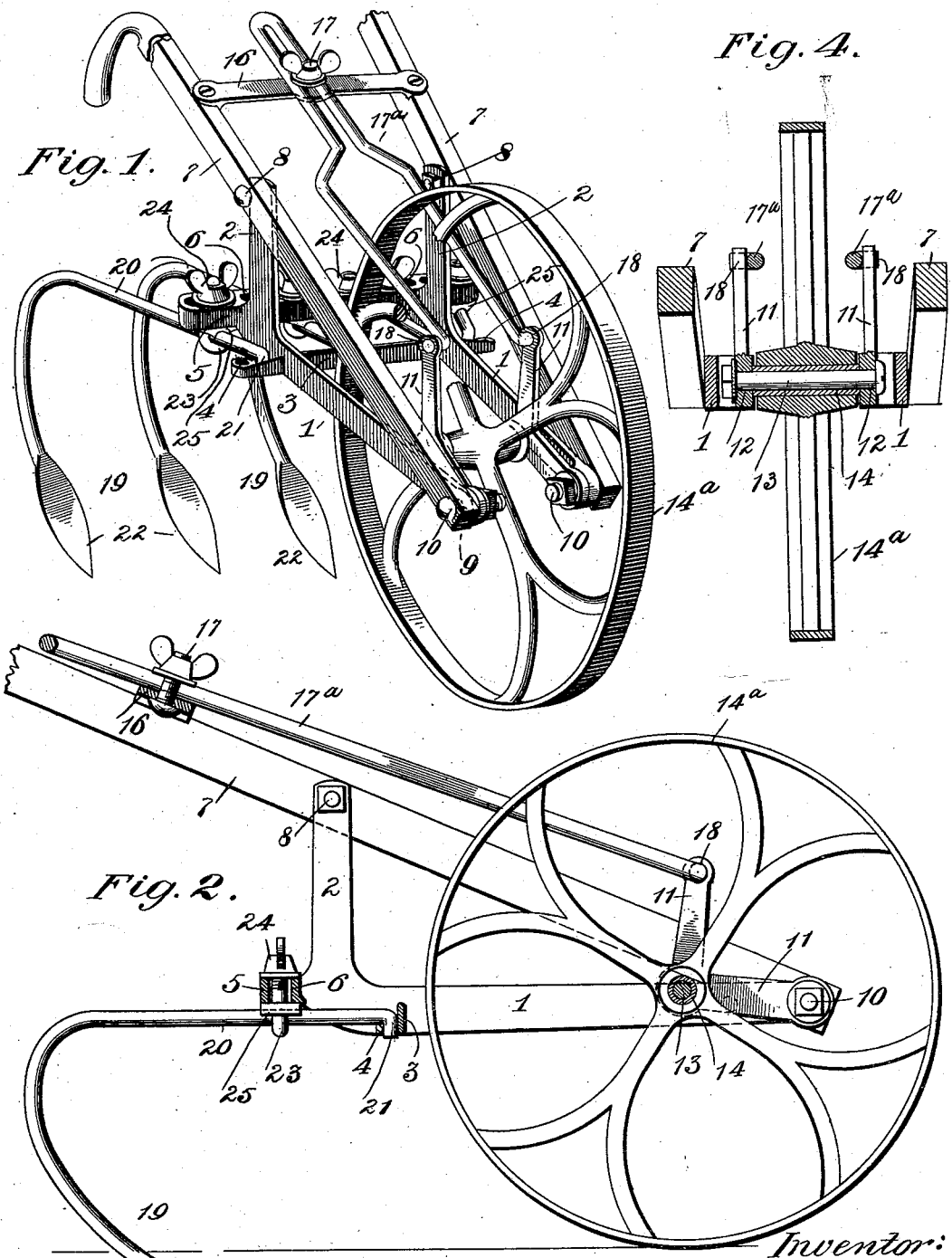
Inventor:
James G. Alexander,
By his Attorney,
Attest:
Edw. D. Duvall Jr.
Martin J. McPike.

(No Model.)
J. G. ALEXANDER.
CULTIVATOR.
No. 601,226. Patented Mar. 29, 1898.
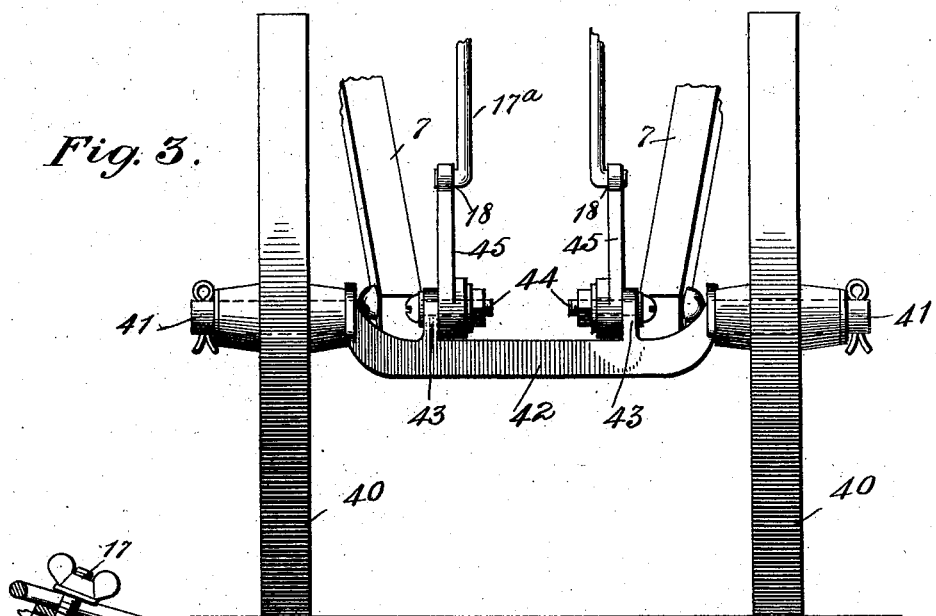
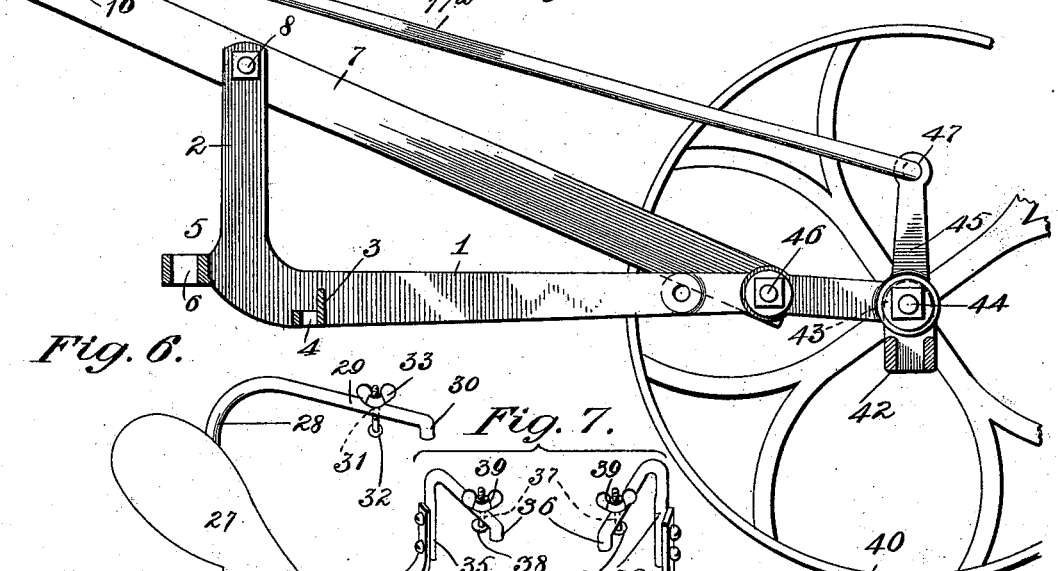
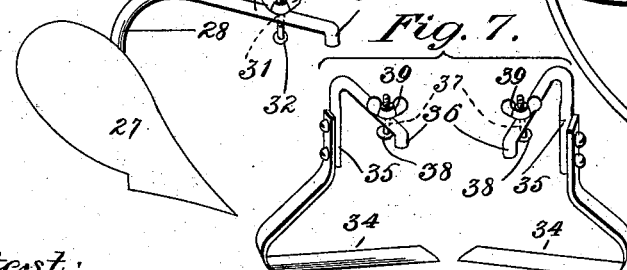
Attest:
Edw. O. Duvall Jr.
M. J. McPike.
Inventor.
James G. Alexander,
By his Attorney,
W. T. Duvall.

UNITED STATES PATENT OFFICE.

JAMES G. ALEXANDER, OF FAIRFIELD, IOWA.

CULTIVATOR.

SPECIFICATION forming part of Letters Patent No. 601,226, dated March 29, 1898.

Application filed August 4, 1897. Serial No. 647,069. (No model.)

*To all whom it may concern:*

Be it known that I, JAMES G. ALEXANDER, a citizen of the United States, residing at Fairfield, in the county of Jefferson and State of Iowa, have invented certain new and useful Improvements in Cultivators; and I do hereby declare the following to be a full, clear, and exact description of the invention, such as will enable others skilled in the art to which it appertains to make and use the same.

My invention relates to improvements in cultivators, the numerous novel features of the invention being particularly applicable to that class thereof operated manually or by hand, although the invention may be incorporated in part or in whole in cultivators operated otherwise than manually.

Among the many objects of my invention are to produce a cheap, simple, and easily-operated cultivator adapted to receive and operate all the usual tools of cultivation—such, for instance, as cultivator-teeth, plows, hoes, &c.; to adapt them for interchangeability by means of a ready removal and application and for adjustment, so as to perform different kinds of work, as may be required, without the necessity of an entire removal of the tool or tools; to adapt the cultivator and whatever tools may be carried thereby for an easy vertical adjustment, so as to cause the tools to operate at greater or less depths, and with such adjustment to simultaneously and automatically adjust the handle-bars, whereby they maintain their relative height from the ground irrespective of the depth of cultivation carried on, and, finally, to adapt the machine to receive and be operated in connection with either a single wheel or a pair of wheels—such change being readily performed—and to equalize, lighten, and distribute the draft.

Other objects and advantages of my invention will hereinafter appear, and the novel features thereof will be particularly pointed out in the claims.

Referring to the drawings, Figure 1 is a perspective view of a cultivator constructed in accordance with my invention, the same being shown as supported upon a single wheel. Fig. 2 is a vertical longitudinal sectional view of the same. Fig. 3 is a front elevation of the front portion of the cultivator, the same being shown in connection with two wheels. Fig. 4 is a transverse vertical sectional view of the front end of the cultivator shown in Fig. 1, the view being taken through the wheel and its axle. Fig. 5 is a view similar to Fig. 2, illustrating a slightly-modified manner of connecting the bell-cranks with the frame-bars. Figs. 6 and 7 are details of different tools my cultivator is adapted to receive and operate.

Similar numerals of reference indicate similar parts throughout the drawings.

In putting my invention into practice I employ a light cast-metal frame, and the same may comprise the two opposite slightly-converging side bars 1, at the rear ends of which are formed the uprights 2, or any other kind of support may be used in lieu of uprights, as preferred. The two side bars 1 are connected in the present instance by a cross-bar 3, the same being located slightly in advance of the uprights 2 and terminating beyond the side bars. This cross-bar 3 is provided at intervals with circular openings 4, adapted, in a manner hereinafter described, to receive the cylindrical ends of the shanks of various kinds of cultivating-tools. In rear of the cross-bar 3 and in a plane somewhat above the same is located a cross-bar 5, which also connects the side bars 1 and at its ends projects beyond the same in a manner similar to the cross-bar 3. The rear cross-bar 5 is provided with elongated openings or slots 6 nearly throughout its length, and in fact, if preferred, the slot may be formed by securing a pair of bars parallel and at a suitable distance apart to produce the required slot. I prefer, however, to cast the side bars, uprights, and two cross-bars all in a single piece.

A pair of handle-bars 7 are at intermediate points bolted, as at 8, to the upper ends of the uprights 2, and their front ends are perforated transversely and coincident with perforations 9 formed in the ends of the side bars 1. The front ends of the handle-bars and side bars are connected by transverse bolts 10, passed through said perforations. Pivotally mounted on the inner ends of these bolts 10 are the front ends of the lower branches of a pair of bell-crank levers 11, the same being confined in pivotal position by means of nuts and washers, as shown. The angles of the two bell-cranks have eyes 12, which are in transverse alinement and are connected by means of a transverse bolt or rod 13, over which is fitted a sleeve 14, which at its ends bears against the inner surfaces of said bell-cranks. This sleeve serves as a bearing for the single ground-wheel 14ª, located between the two bell-cranks and side bars 1 of the cultivator-frame.

The two handle-bars may be connected at points at or near the uprights 2 by means of a transverse bar 16, the same being perforated at its center for the reception of a thumb-screw 17. A forked adjusting-rod 17ª may be employed, the same at its upper narrower end receiving the thumb-screw and being adapted to be impinged upon by the same, whereby it may be secured at any point of its adjustment, and at its lower, front, or diverged end being pivotally connected, as at 18, to the upper ends of the vertical branches of the bell-cranks 11.

As before stated, in Figs. 6 and 7 I have illustrated some of the many garden cultivating-tools which may be employed in connection with my cultivator. The cultivator-tooth 19 comprises the shank 20, round in cross-section and bent abruptly at a right angle at its front end, forming a head 21, and at its lower end flattened and tapered to form a tooth 22. In use the angular head is inserted downwardly through one of the openings 4, the shank extending rearward under the cross-bar 5. The rear portion of the shank passes through the opening in an eyebolt 23, the shank of said bolt extending upwardly through any one of the series of holes 6 with which the cross-bar 5 is provided, and has applied to its end above said cross-bar a winged nut 24. A washer 25 is interposed between the under side of the cross-bar 5 and the shank, such washer being grooved in its under side to fit the shank. It will be seen that by locating the eyebolt at various points in the slots 6 any desired lateral adjustment may be given the cultivator-tooth. It will be perfectly obvious that a gang or any number of such teeth may be employed and that by removing the center tooth of such gang a straddle-row cultivator is produced, the same being designed to cultivate at each side of a row.

In Fig. 6 I have illustrated a plow attachment, wherein 27 designates the moldboard and 28 the standard, said standard in this instance being curved forward and terminating in a shank 29, having an angular head 30, round in cross-section, that is adapted to be inserted into any one of the perforations 4, as heretofore described. The shank is also provided with a perforation 31, and upwardly through the same extends a bolt 32, that extends through the slot formed in the cross-bar 5, above which it is provided with a winged nut 33.

In Fig. 7 I have illustrated a pair of scraper-blades or hoes, which may be used either singly or in conjunction for the purpose of weeding, &c. 34 designates the hoe-blade, which is of angular form and is pivotally connected to a bent shank 35, terminating at its front end in an angular head 36, adapted to enter one of the holes 4 formed in the cross-bar 3. Like the plow, the shank of each hoe is provided with a perforation 37, through which is inserted a bolt 38, designed to pass through the slot 6 of the cross-bar 5 and to receive above the same a winged nut 39. Other tools for various purposes may be designed and substituted for those shown.

It will be observed that in operating the cultivator manually the same is pushed steadily along in front of the operator. If at any time it is desired to raise or lower the cultivating-tool, the same may be readily accomplished and the tool or tools made to run deep or shallow by simply loosening the thumb-nut that adjusts the bell-crank-operating rod and through the medium of the latter moving the bell-cranks backward or forward on their pivots, the cultivating tool or tools serving as the fulcrum to give the frame the desired tilt.

If preferred, I may mount the cultivator on a pair of wheels 40, as indicated in Fig. 5. In such instance I employ an axle 41, the same being preferably dropped between its ends, as indicated at 42, and provided at each side of its dropped center with upwardly-disposed lugs 43, the same being perforated to receive transverse bolts 44, which also pass through the perforations in the angles of the bell-cranks 45, the positions of the latter being reversed to that heretofore described. The rear lower branches of the bell-cranks are pivotally connected, as at 46, to the front ends of the side bars 1, and the upper ends of the vertical or upper branches of the bell-cranks are pivotally connected, as at 47, to the front ends of the forked adjusting-bar 48. The operation of adjusting the tools for cultivating at different depths is the same as heretofore.

It will be noted that the cultivator may readily be changed from a single-wheel cultivator to a two-wheel cultivator, as preferred by the operator.

Having thus fully described my invention, what I claim as new, and desire to secure by Letters Patent of the United States, is—

1. In a cultivator, the combination with a framework comprising a cross-bar provided with a series of perforations and with a rear cross-bar provided with an elongated opening, of a cultivating-tool provided with a cylindrical shank terminating at one end in a right-angularly-disposed head fitting removably and pivotally in the perforation of said cross-bar, and a fastening device located in the slot or elongated opening of the rear cross-bar and secured at its lower end to the shank of said tool.

2. In a cultivator, the combination with a framework comprising a cross-bar provided with a series of perforations, and a rear slotted cross-bar located above the horizontal plane of the front cross-bar of a cultivating-tool provided with a shank bent at its front end to form a head and pivoted in one of the holes in the front cross-bar, and an eyebolt loosely receiving the shank and extending up through the slot in the rear cross-bar, and a nut on the upper end of said bolt.

3. In a cultivator, the combination with a framework comprising a front and a rear cross-bar, the former being perforated and the latter slotted and located above the horizontal plane of the former, of a cultivator-tooth having a cylindrical shank bent at one end and loosely engaging one of said perforations, an eyebolt loosely receiving the shank a washer carried by the eyebolt and having its under side grooved to receive the shank, and a nut located on the upper end of the bolt.

4. In a cultivator, the combination with a frame carrying cultivating-tools, of bell-cranks pivoted to the front end of the frame, a supporting-axle carried by the bell-cranks at points eccentric to where they are pivoted to the frame, an adjusting-rod pivoted to the bell-cranks at the ends of their branches, and means for securing said adjusting-rod in its adjusted position.

5. In a cultivator, the combination with a frame carrying cultivating-tools, of bell-cranks pivoted to the front end of the frame, a supporting-axle carried by the bell-cranks at points eccentric to where they are pivoted to the frame, a pair of handle-bars secured to the frame, an adjusting-rod connected to the branches of the bell-cranks, and means for securing the adjusting-rod.

6. In a cultivator, the combination with a frame and a pair of handle-bars, of a pair of bell-cranks pivoted to the front ends of the frame, a supporting-axle carried by the bell-cranks and connected to the same at points eccentric to where they are connected to the frame, and means for adjusting and securing the bell-cranks at a desired angle.

7. In a cultivator, the combination with a frame and a pair of handle-bars terminating coincident with the front ends of the side bars of the same, of a pair of bell-cranks pivoted at the front ends of their lower branches to the frame and handle-bars, an axle located between the angles of said bell-cranks, a wheel carried by the axle between the bell-cranks, an adjusting-rod connected to the upper ends of the upper branches of the bell-cranks, and means for securing the rod in any of its adjusted positions.

In testimony whereof I affix my signature in presence of two witnesses.

JAMES G. ALEXANDER.

Witnesses:
THOS. BELL,
E. F. SIMMONS.